United States Patent [19]

Bosne

[11] 4,450,902
[45] May 29, 1984

[54] HEAT EXCHANGER IN PARTICULAR FOR AN ATMOSPHERIC COOLING TOWER

[75] Inventor: Jacques G. P. E. Bosne, Viroflay, France

[73] Assignee: Hamon-Sobelco, S.A., Brussels, Belgium

[21] Appl. No.: 362,058

[22] Filed: Mar. 26, 1982

Related U.S. Application Data

[60] Continuation of Ser. No. 150,287, May 16, 1980, which is a division of Ser. No. 893,788, Apr. 5, 1978.

[30] Foreign Application Priority Data

Oct. 7, 1977 [FR] France .............................. 77 30221

[51] Int. Cl.³ .............................................. F28F 9/00
[52] U.S. Cl. ......................................... 165/82; 165/67; 165/DIG. 1; 165/DIG. 8; 165/162
[58] Field of Search ............... 122/510, 6 A; 165/162, 165/67, 68, 81, 82, 172, 179, DIG. 8

[56] References Cited

U.S. PATENT DOCUMENTS

| | | | |
|---|---|---|---|
| 1,802,413 | 4/1931 | Engler | 165/162 X |
| 1,881,161 | 10/1932 | Amacost . | |
| 1,884,210 | 10/1932 | Potter . | |
| 1,962,909 | 6/1934 | Price | 165/76 |
| 2,876,975 | 3/1959 | Short | 165/82 |
| 3,659,561 | 5/1973 | Michel | 122/6 A |
| 4,114,684 | 9/1978 | Jenis et al. | 165/162 |

FOREIGN PATENT DOCUMENTS

| | | |
|---|---|---|
| 1601246 | 5/1970 | Fed. Rep. of Germany . |
| 2055803 | 5/1972 | Fed. Rep. of Germany . |
| 2213229 | 9/1973 | Fed. Rep. of Germany ..... 122/6 A |
| 1523994 | 3/1968 | France . |
| 2200491 | 4/1974 | France . |
| 2304048 | 10/1976 | France . |
| 679058 | 9/1952 | United Kingdom . |

Primary Examiner—Albert W. Davis, Jr.
Attorney, Agent, or Firm—Kerkam, Stowell, Kondracki & Clarke

[57] ABSTRACT

A heat exchange comprises a battery of rectilinear tubes of synthetic plastic material connected at their respective ends to headers. At least one of the headers is fixed to the wall of the tower and the remainder of the exchanger is mounted by suspension members to allow free expansion of the tubes of the battery.

9 Claims, 9 Drawing Figures

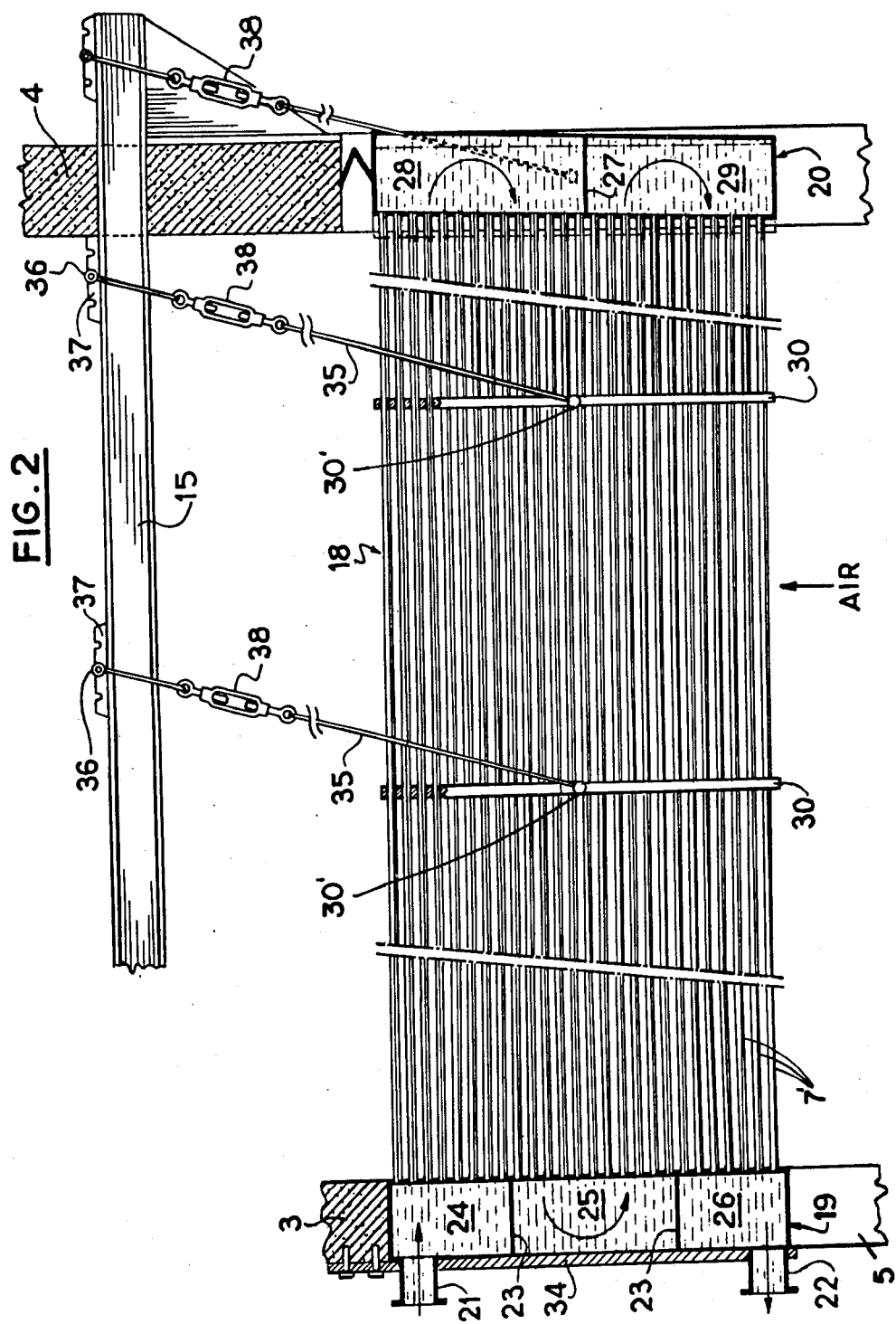

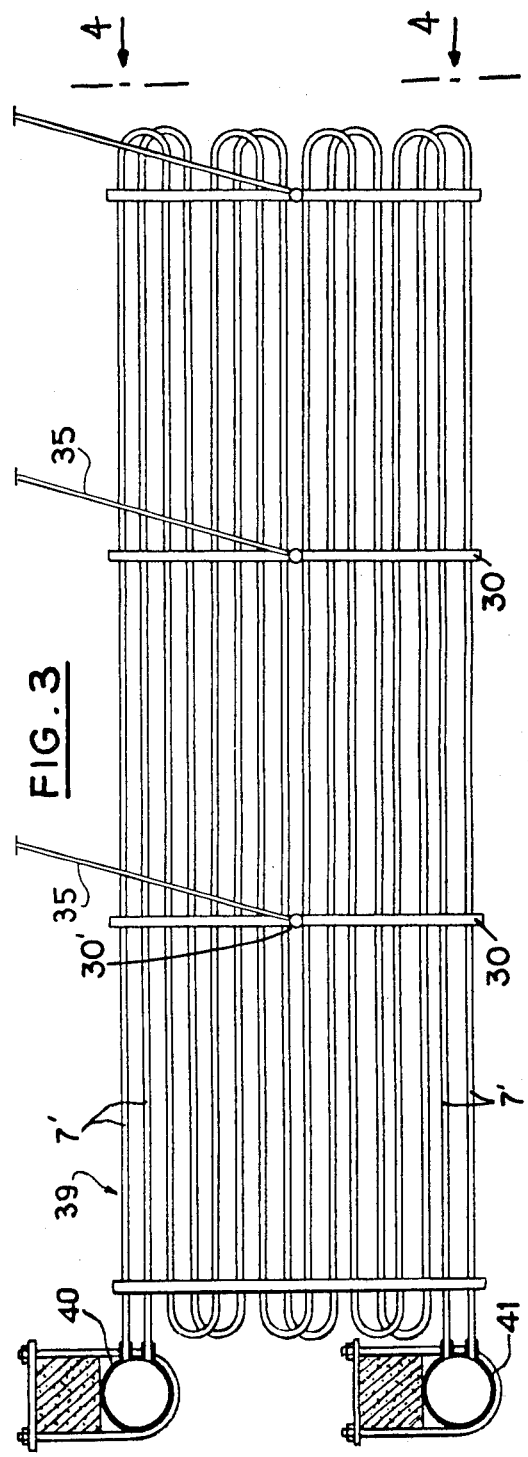
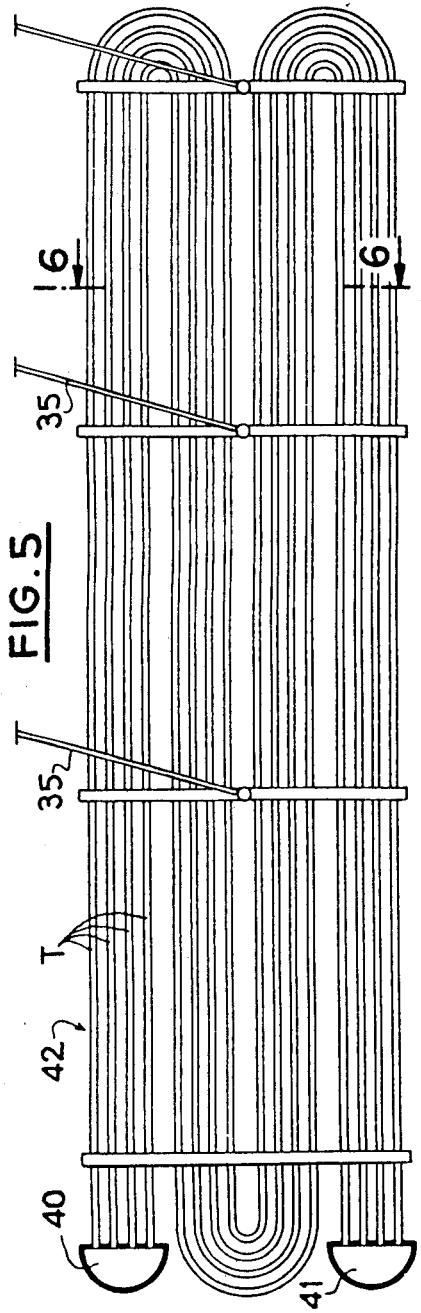
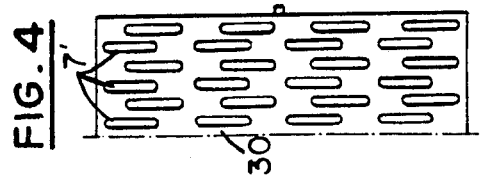
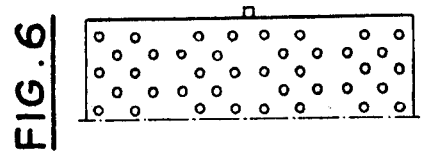

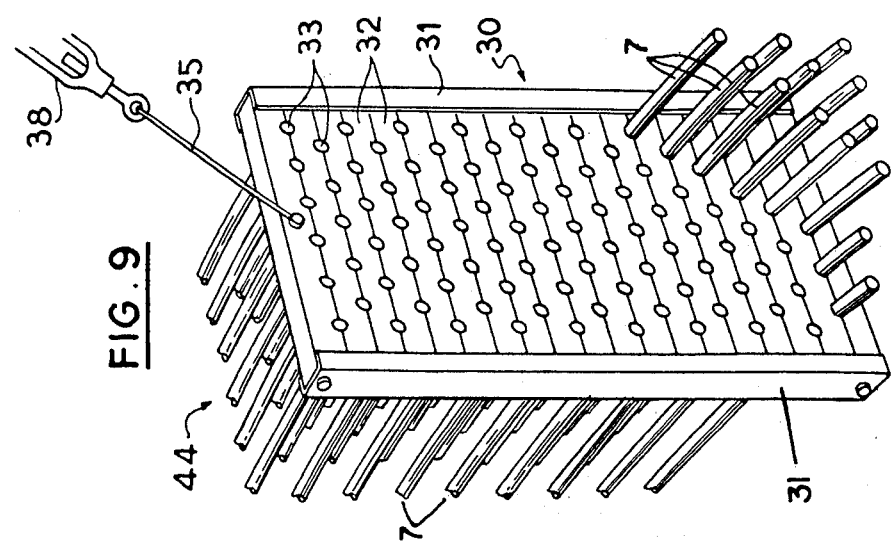
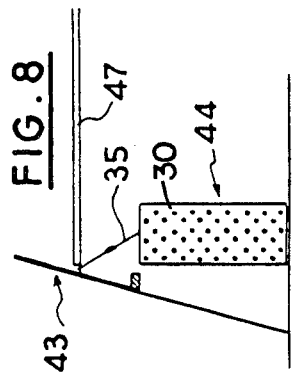
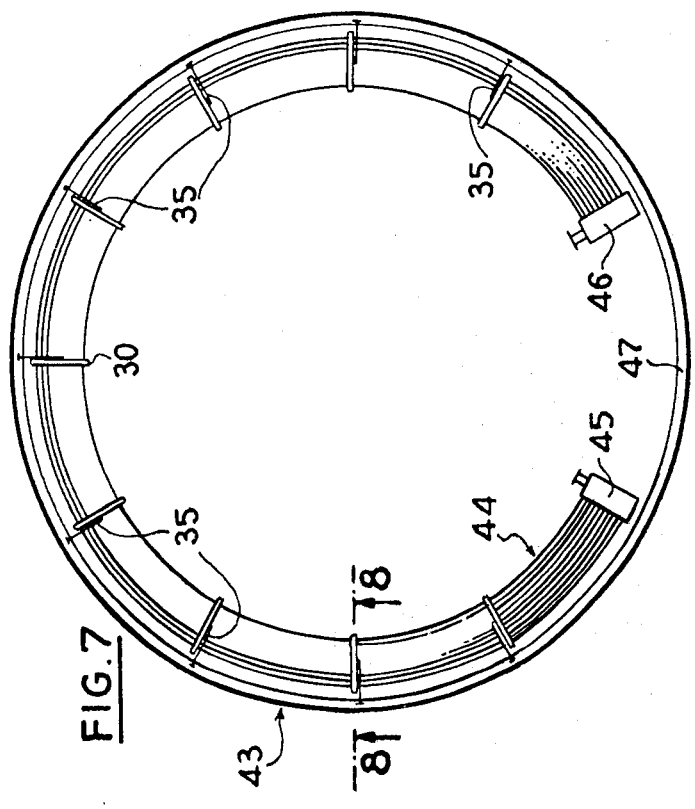

HEAT EXCHANGER IN PARTICULAR FOR AN ATMOSPHERIC COOLING TOWER

This application is a continuation, of application Ser. No 150,287, filed May 16, 1980 which is a division of application Ser. No. 893,788 filed Apr. 5, 1978.

BACKGROUND OF THE INVENTION

1. Field of the Invention

The present invention relates to a heat exchanger for exchanging heat between a first fluid and at least a second fluid of the type comprising a horizontal battery of long tubes which are supported at intervals by spacer devices. The first fluid circulates through the tubes and the second fluid flows about the battery of tubes transversely with respect to the tubes. The invention also relates to an atmospheric cooling tower comprising at least one heat excahnger of this type.

2. Description of the Prior Art

Atmospheric coolers, employed for cooling industrial waters by the atmosphere, may be of the "wet" type in which the water to be cooled is in direct contact with the air, or of the "dry" type in which the water travels through tubes around which the air is circulated, or of the "combined" type which combines these two methods. In coolers of the "dry" type and "combined" type, there are generally employed exchangers comprising finned or smooth metal tubes. In these two cases, for technical reasons, in particular internal and external corrosion of the tubes, and for economic reasons, there is a tendency to substitute smooth tubes of plastic material for the metal tubes. However, the construction of such heat exchange batteries of smooth tubes of plastic material presents delicate technical problems as synthetic materials have high thermal coefficients of expansion. For example, a tube having a length of around fifteen meters lengthens more than ten centimeters during a temperature change of about 15°-20° C. to a temperature of about 90° C. Under these conditions, it will be understood that the installation of such batteries of tubes of synthetic material in a cooler is very difficult, since the tubes will lengthen to this extent when the cooler changes from its operative to inoperative states. If no particular precaution is taken, and these batteries of tubes of plastic material are mounted in a manner identical to that of conventional batteries of finned metal tubes, the tubes, which are supported at intervals by spacer devices so as to maintain them perfectly rectilinear and parallel to each other, will deflect or bend between the spacer devices and this will completely modify the geometry of the air passages defined between the tubes and considerably adversely affect the heat exchange capability of the battery. Further, when an installation is shut down during low outside temperature conditions, the tubes, in shrinking, exert very considerable forces on the support framework to which the battery is fixed at each end.

SUMMARY OF THE INVENTION

An object of the invention is to overcome these drawbacks and to provide a heat exchanger of the aforementioned type with means for absorbing the variations in length of the tubes due to expansion and contraction.

According to the invention, there is provided a heat exchanger of the aforementioned type, wherein the tube battery is suspended, in at least a part of its length, from a support structure by suspension members to which said spacer devices are hooked.

According to a feature of the invention, in the case where the tubes of the battery are rectilinear and where the battery has, at its ends, inlet and outlet header means for said first fluid, the, for example, inlet means for the first fluid is rigidly mounted on the support structure and said battery is suspended freely in the remainder of its length and at its other end.

According to a modification, in the case where the tube battery has a curvilinear contour and is mounted in a fixed manner on the support structure at each end, it is freely suspended between the two ends.

According to the invention, there is also provided an atmospheric cooling tower of the type comprising a chamber provided at its base with at least one air inlet, a heat exchange device for exchanging heat between a fluid and air disposed within the chamber, and means for discharging the air in the upper part of the chamber, wherein the heat exchange device comprises at least one heat exchanger as defined hereinbefore.

BRIEF DESCRIPTION OF THE DRAWING

Further features and advantages of the invention will be apparent from the ensuing description with reference to the accompanying drawing which is given solely by way of example and in which:

FIG. 2 is a partial view to an enlarged scale of the exchanger of the cooler of FIG. 1;

FIG. 3 is a view similar to FIG. 2 of a modification of the exchange according to the invention;

FIG. 4 is an end elevational view of the exchanger of FIG. 3;

FIG. 5 is a view similar to FIG. 2 of another modification of the exchanger according to the invention;

FIG. 6 is a sectional view taken on line 6—6 of FIG. 5;

FIG. 7 is a diagrammatic cross-sectional view of a circular atmospheric cooler provided with a heat exchanger according to the invention;

FIG. 8 is a sectional view taken on line 8—8 of FIG. 7; and

FIG. 9 is a partial view of a spacer device for the heat exchanger of FIGS. 7 and 8.

DESCRIPTION OF PREFERRED EMBODIMENTS

Figure 1:
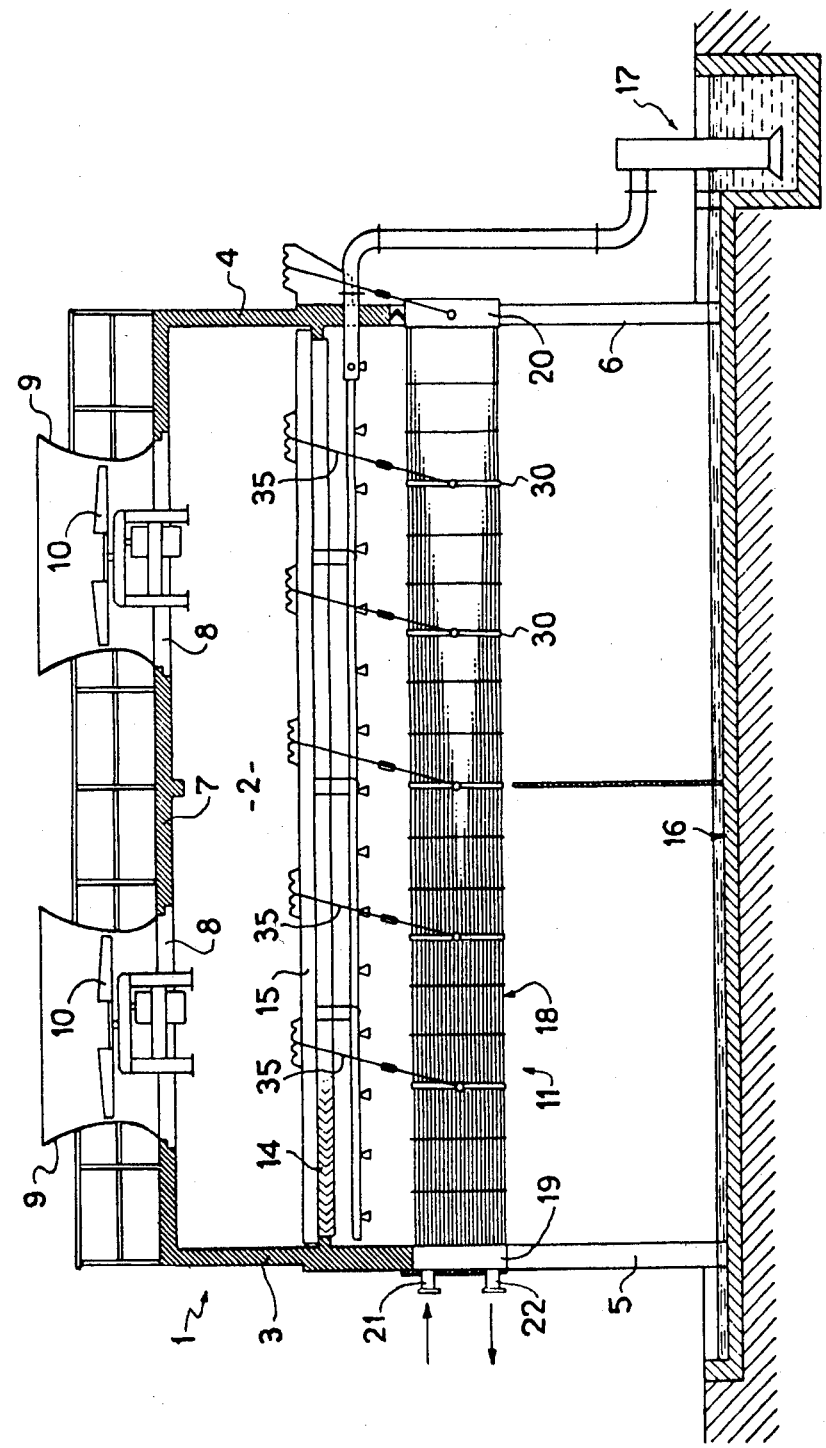
FIG. 1 is a longitudinal sectional view of a wet type atmospheric cooler comprising a heat exchanger having rectilinear tubes according to the invention.

With reference to FIG. 1, there is shown a forced-draught atmospheric cooler 1 comprising a chamber 2, the end walls 3 and 4 of which are open in their lower part thereby defining two air inlets 5, 6 and the upper wall 7 of which is provided with two openings 8 extended by sleeves 9 in which two suction fans 10 are mounted.

Disposed within the chamber 2 is a heat exchanger 11 comprising a series of tubes 7 extending throughout the length of the chamber 2. The heat exchanger 11 is surmounted by a system 12 of water distribution tubes provided with dispersing nozzles 13 and by droplet separator panels 14 suspended from longitudinal girders 15. Further, the cooler 1 has at its base a tray or pool 16 for receiving water coming from the distribution system 12 and by a circuit 17 for recycling water which is supplied to the distributing system.

The heat exchanger 11 comprises a battery 18 of smooth tubes 7 of synthetic material, for example plastic material, these rectilinear and parallel tubes being fixed in a sealed manner at both ends in respective water boxes or headers 19, 20. The water box 19 comprises means 21, 22 for connecting it to a water inlet pipe and a water discharge pipe respectively.

In the embodiment shown in FIG. 2, the water box 19 includes partition walls 23 which divide it into three separate chambers 24, 25, 26 and the other water box 20 is divided by a median partition wall 27 into two separate chambers 28, 29. With this conventional arrangement, in operation, the water effects four passages or travels four times through the length of the battery 18 by circulating through the four nests of superimposed tubes 7 between the partition walls of the two water boxes, as shown by arrows in FIG. 2. As the tubes 7 are relatively flexible and of great length, they are supported at intervals by spacer devices 30, formed, for example as shown in FIG. 9, by rigid rectangular frames 31 consisting of U-section members between which strips 32, provided with semi-circular notches, define openings 33 therebetween for the passage and support of the tubes 7. A more detailed description of these spacer devices may be had from U.S. patent application Ser. No. 760,690, filed Jan. 19, 1977.

According to the invention, the battery 18 of tubes of the heat exchanger 11 is fixed to its support structure only at one of the ends thereof. In the illustrated embodiment, its water inlet and outlet box 19 is fixed to the adjacent wall 3 of the cooler directly above the air inlet 5, for example by means of a plate 34 which is bolted or otherwise fixed to the water box 19 and to the wall 3. It is must be understood that the invention is not limited to this embodiment, and the water box 19 or the like could be fixed by any other suitable means to a suitable fixed part of the cooler.

The battery of tubes 18 is freely suspended in the remainder of its length and at its other end by suspension members 35 which are hooked to the spacer devices 30 and to the water box 20 in their lower part and to the longitudinal girders 15 in their upper part.

Associated with each spacer device 30 and with the water box 20 are two suspension members 35 which are hooked to the respective sides of said elements substantially in the middle of the height of the tube battery 18. These suspension members 35 are disposed in two vertical planes oriented in the longitudinal direction of the battery 18. The upper hooking points of the suspension members 35 on the longitudinal girders 15 are offset toward the suspended end of the battery 18 relative to the vertical from their lower hooking points 30' to the spacer devices 30, and to the water box 20 in respect to the end suspension member. Thus, the inclination of the suspension members 30 to the vertical permits an adjustment of the horizontal component of the weight of the suspended elements. Moreover, there is added to this horizontal component the force due to the bottom effect exerted against the bottom of the moving water box, the resultant of these two forces enabling a sufficient pull to be exerted for tensioning the tubes 7 so that they are perfectly rectilinear.

In the embodiment shown in FIG. 2, each pair of suspension members 35 associated with a spacer device 30 is hooked in its upper part to a bar 36 received in transversely-aligned notches of two racks 37 fixed to the upper part of these girders 15. In this way, the position of the upper hooking point of the suspension members, and consequently the inclination of the suspension members and the pull exerted on the tubes, may be adjusted. It must be understood that the invention is not limited to this embodiment of the adjusting means and the latter may be of any other suitable form. Appropriate means 38, for example, tensioning screw devices, are provided for adjusting the length of the suspension members 35 for the purpose of suitably positioning the battery of tubes so the these tubes 7 are roughly horizontal in service.

The operation of the atmospheric cooler 1 is conventional and will consequently only be described briefly. As mentioned before, the water to be cooled arriving by way of the inlet pipe enters the upper part of the water box 19 and travels four times the length of the battery 18 before issuing from the battery in the lower part of the water box 19. In the course of this circulation in the tubes 7 of the battery of tubes, the water is progressively cooled by air flow which, enters by way of the air inlets 5, 6, travels through the gaps between the tubes 7 of the battery of tubes 18 and is then drawn out of the chamber 2 by the fans 10. In order to improve the transmission of heat from the wall of tubes 7 to the air, there is employed in the known manner a spray of water onto the external surfaces of the tubes. This spray of water is effected by the distributing system 12 and the nozzles 13 and the sprayed water flow through the spaces between the tubes 7 of the battery 18 and is received in the tray 16 then put back into circulation in the system 12 by the circuit 17 which includes a water pump 17'. Further, the droplet separator panels 14 mounted above the distributing system 12 trap the droplets which are carried upwardly in suspension in the air.

As mentioned before, when the cooler 1 changes from its inoperative state to its operative state, the tubes 7 pass from the ambient temperature of the order of 10°–20° C. to a temperature of the order of 80°–90° C. and the tubes of synthetic material undergo a considerable lengthening which may be ten to fifteen times greater than that of steel tubes of the same length. Such lengthening may exceed about ten centimeters in respect to tubes of about fifteen meters long. Owing to the arrangement according to the invention, this expansion can occur freely by swinging of the suspension members 35 about their upper hooking points. On the other hand, this would not be the case if, as in conventional constructions, the battery of tubes were fixed at both ends. Indeed, the tubes would then be prevented from free longitudinal expansion and, instead of being maintained perfectly rectilinear they would bend considerably between the intermediate spacer devices and between the water boxes and the adjacent spacer devices. Such expansion would profoundly modify the geometry of the air passages between the tubes and would have considerable adverse effect on the uniform circulation of the air through the tube battery and moreover would produce an accumulation of the sprayed water at the lower points of the tubes and an absence thereof at the high points. In other words, good thermal efficiency of the heat exchanger would be seriously affected.

Further, there is no problem at the sealed joints between the tubes and the water boxes with the arrangement according to the invention. The suspension system is sufficient to exert a pull of between a few hundredths of gram and a few kilograms on each tube to maintain it under tension.

The pulling force exerted on the tubes to maintain them rectilinear, may be augmented by, for example a heavier or ballasted water box, springs or the like disposed between the suspended water box 20 and the fixed part of the cooler, a pulley with a counterweight, etc.

A more detailed examination of the expansion problems which arise in a battery of smooth tubes of plastic material in which, as shown in FIG. 2, the water to be cooled effects a plurality of passages, reveals that the temperature of the water and of the tubes of the first passage is distinctly higher than that of the water and tubes of the last passage, that is to say the lower passage. Indeed, when the water reaches the last passage, it has been cooled in the course of the preceding passages, whereas in the first passage, the water arrives at a substantially higher temperature and is in indirect contact with the air which has been heated by its passage through the three lower water passages. Consequently, there is differential expansion between the tubes of the different passages depending on their position in the battery.

Thus, for example, in respect of a battery of 1.20 m in height having 5,000 tubes 12 m long arranged for four passages as in the embodiment shown in FIG. 2, there is found a difference of linear expansion of 8 cm between the lowest tubes and the highest tubes of the battery for a cooling difference of 50° C. Since the battery is fixed at only one end, this differential expansion of the tubes occurs freely. This differential expansion is shown in FIG. 2 in which the position of the water box 20 is shown in dot-dash lines in its position when the heat exchanger is not in service and in full lines in its position when the exchanger is in operation.

In this respect, it will be noted that it is possible to take into account the foreseeable expansion of the tubes and slightly under-dimension the upper tubes when assembling them so that, in service, the water box 20 occupies exactly the required longitudinal position in the air inlet 6 of the cooler. It will also be recognized that it is possible to adjust the position of water box 20, in the vertical direction, by the means 38 for adjusting the length of the suspension members 35. In this way it is possible to adjust the assembly so that, in operation, the tubes 7 are roughly horizontal thereby ensuring a more uniform distribution of the sprayed water on the tubes and consequently better thermal efficiency of the system.

With reference now to FIGS. 3 and 4, there is shown a modification of the heat exchanger 11 in which the tube battery 39 does not have water boxes at each end thereof. The tubes 7' of this battery are coiled to-and-fro and side-by-side in vertical planes extending in the longitudinal direction of the battery and each thereof is connected at the upper end to a fluid inlet header 40 for the inlet of the fluid to be cooled. More precisely, there is provided a single coiled tube 7' in each longitudinal vertical plane of the battery with the tubes of two adjacent planes being vertically offset from each other. The advantage of this arrangement is the elimination of the relatively expensive water boxes of conventional batteries and elimination of the many sealing joints between the tubes and the water boxes, the cost of which is extremely high, in particular in respect to labor costs for installation.

FIGS. 5 and 6 show a modification of the exchanger of FIGS. 3 and 4 in which the tube battery 42 comprises a plurality of tubes 7" which are coiled to-and-fro and disposed parallel to each other in each longitudinal vertical plane. This embodiment has the same advantages over conventional tube batteries as that of FIGS. 3 and 4.

Reference will now be made to FIGS. 7 to 9 which show the invention employed in an atmospheric cooling tower 43 having a curvilinear contour. The heat exchanger 11' is formed by a tube battery 44 of smooth tubes 7''' which are formed of synthetic material and of curvilinear configuration, for example in the shape of an arc of a circle, and are interconnected at intervals by spacer devices 30 as described hereinbefore. A description of a tube battery of this type and of the cooler in which it is mounted is given in U.S. Patent Application Ser. No. 760,690 to which reference may be made.

According to this invention, the problem of tube expansion and contraction is solved by mounting the tube battery 44 in a fixed manner on the cooler only by its ends, that is to say its water boxes 45, 46, and suspending it freely throughout the remainder of its length. The suspension members 35 are preferably hooked to the upper part of the spacer devices 30 substantially in the middle of the width of the battery 44 and they are each disposed in a vertical plane oriented in the direction of the radius or curvature of the contour of the battery in the region of the spacer device with which they are associated. In order to exert a continuous radial tension on the tubes, the upper hooking points of the suspension members 35 on the support structure of the tower, which may comprise for example a circular L-section beam member 47 fixed to the wall of the tower 43, are offset outwardly on the outer side of the contour of the tube battery 44 relative to the vertical from their lower hooking point on the spacer devices 30. It will be observed that this embodiment only requires the presence of a single suspension member 35, FIG. 9, per spacer device 30. Of course, several suspension members 35 may be provided if necessary. Moreover, as for the previously described rectilinear batteries, it is preferable to provide means 38, FIG. 9, for adjusting the length of the suspension members and means for adjusting the radial position of their upper hooking points so as to control the radial tension force to which the battery is to be subjected. Such means may comprise elements such as 37, shown in FIG. 2 of the application.

Irrespective of the envisaged embodiment, the cooler having a suspended battery according to the invention has the advantage of requiring only very simple mechanical means which present no working problem, even in a damp atmosphere such as is encountered in wet coolers of the type shown in FIG. 1 or in combined wet and dry coolers.

It will be understood that many modifications may be made in the various embodiments described hereinbefore without departing from the scope of the invention. Thus, for example in the case of rectilinear batteries, the position of the hooking points of the suspension members on the spacer devices may be modified in accordance with particular requirements of construction so as to place the hooking points either above or below the horizontal plane containing the center of gravity of the battery instead of placing these points in this plane as illustrated in the drawings. The same is true in respect of the hooking point of the end suspension member of the suspended water box 20, it being moreover possible to longitudinally offset this point relative to the vertical from the centre of gravity of the water box. In the case of the tube battery of curvilinear shape of FIGS. 7 to 9, the hooking points may also be different from that illustrated and indicated, it being possible, for example, to arrange the hooking points on the outer side of the spacer device. Moreover, it must be understood that the heat exchanger according to the invention may be formed by a plurality of rectilinear and/or curvilinear batteries disposed side-by-side or end-to-end at a sufficient distance from each other to allow the free expansion thereof.

Apart from the different modifications which may be made in the described embodiments, it must be noted that the heat exchanger according to the invention is in no way limited to this application in an atmospheric cooling tower but, on the contrary, it may be employed whenever a first fluid must be put in heat exchanging contact with at least a second fluid and when there may be problems of the expansion of the tubes.

I claim:

1. A heat exchanger for exchanging heat between a first fluid and at least a second fluid, of the type comprising a horizontal battery of tubes of substantial length supported at intervals by spacer devices, said first fluid circulating through said tubes and said second fluid passing through said battery transversely with respect to the tubes, wherein said battery is suspended in at least a part of its length from suspension members to which said spacer devices are suspended and including inlet and outlet means for the first fluid comprising an inlet collector and an outlet collector to which the respective ends of each of said tubes are connected, said tubes being coiled to-and-fro in vertical planes extending in the longitudinal direction of the battery, a rigid support structure, means connecting the inlet collector and the outlet collector to the rigid support structure, said suspension members including first hooking points on each of said spacer devices, means connecting the lower ends of the suspension members to the first hooking points, second hooking points for each of the suspension members, said second hooking points positioned above the first hooking points of the spacer devices and horizontally offset in a direction to continuously urge its connected spacer device and the tubes supported therein away from the rigid support structure to thereby maintain the horizontal path of said battery of tubes during expansion and contraction of the tubes thereof, and wherein at least some of said spacer devices are intermediate the ends of said battery and urged away from said rigid support structure by said suspension members and wherein each of said spacer devices comprises a rigid frame having openings for support and passage of said tubes.

2. A heat exchanger as claimed in claim 1, comprising at least one tube coiled to-and-fro in each of said vertical planes and wherein two adjacent tubes are vertically offset from each other.

3. A heat exchanger as claimed in claim 7, comprising a plurality of tubes coiled to-and-fro and disposed parallel to each other in each of said vertical planes.

4. A heat exchanger for exchanging heat between a first fluid and at least a second fluid, of the type comprising a horizontal battery of tubes of substantial length supported at intervals by spacer devices, said first fluid circulating through said tubes and said second fluid passing through said battery transversely with respect to the tubes, wherein said battery is suspended in at least a part of its length from suspension members to which said spacer devices are suspended including means for directing the first fluid through said tubes, said means including a first water box and a second water box to which the tubes are connected in a sealed manner, a rigid support structure connected to the first water box, said suspension members including first hooking points on each of said spacer devices, means connecting the lower ends of the suspension members to the first hooking points, second hooking points for each of the suspension members, said second hooking points positioned above the first hooking points on the spacer devices and horizontally offset in a direction to continuously urge its connected spacer devices and the tubes supported therein away from the rigid support structure to thereby maintain the horizontal path of said battery of tubes during expansion and contraction of the tubes thereof, and wherein at least some of said spacer devices are intermediate the ends of said battery and urged away from said rigid support structure by said suspension members and wherein each of said spacer devices comprises a rigid frame having openings for support and passage of said tubes.

5. A heat exchanger as claimed in claim 4 wherein said battery including the second water box is suspended freely along its length except at said first water box, further wherein said suspension members are oriented in the longitudinal direction of the battery, and wherein said upper hooking points are offset toward said second water box relative to the vertical from said lower hooking devices.

6. A heat exchanger as claimed in claim 4 wherein, said battery has a curvilinear contour and is mounted in a fixed manner on a support structure at each of its ends, said first hooking points and second hooking points are horizontally offset in a direction to continuously urge its connected spacer device and the tubes supported therein radially away from the support structure to thereby maintain the curvilinear contour of said battery of tubes during expansion and contraction of the tubes thereof.

7. A heat exchanger as claimed in claim 6, wherein each suspension member is disposed in a vertical plane oriented in the direction of the radius of curvature of said contour in the region of the associated spacer device.

8. A heat exchanger as claimed in claim 6, wherein the support structure includes means for adjusting the radial position of the upper hooking point of the suspension members.

9. A heat exchanger as claimed in claim 8, wherein said suspension members are hooked to the upper part of the spacer devices, substantially in the middle of the width of said battery.

* * * * *

UNITED STATES PATENT AND TRADEMARK OFFICE
CERTIFICATE OF CORRECTION

PATENT NO. : 4,450,902
DATED      : May 29, 1984
INVENTOR(S) : Jacques G.P.E. Bosne It is certified that error appears in the above-identified patent and that said Letters Patent is hereby corrected as shown below:

Column 7, line 54, "Claim 7" should be -- Claim 1 --.

Signed and Sealed this

Second Day of October 1984

[SEAL]

Attest:

GERALD J. MOSSINGHOFF

*Attesting Officer*  *Commissioner of Patents and Trademarks*